(12) United States Patent
Bach Andersen et al.

(10) Patent No.: US 9,000,650 B2
(45) Date of Patent: Apr. 7, 2015

(54) LAMINATED CORE FOR ELECTROMAGNETIC APPLICATIONS

(75) Inventors: Niels Kristian Bach Andersen, Bjerringbro (DK); Brian Lundsted Poulsen, Bjerringbro (DK); Thomas Blad, Bjerringbro (DK); Kjeld Hellegaard, Bjerringbro (DK)

(73) Assignee: Grundfos a/s, Bjerringbro (DK)

( * ) Notice: Subject to any disclaimer, the term of this patent is extended or adjusted under 35 U.S.C. 154(b) by 558 days.

(21) Appl. No.: 11/569,270

(22) PCT Filed: Apr. 15, 2005

(86) PCT No.: PCT/EP2005/003985
§ 371 (c)(1), (2), (4) Date: Mar. 21, 2007

(87) PCT Pub. No.: WO2005/114813
PCT Pub. Date: Dec. 1, 2005

(65) Prior Publication Data
US 2007/0196615 A1    Aug. 23, 2007

(30) Foreign Application Priority Data

May 17, 2004    (EP) ..................................... 04011645

(51) Int. Cl.
*H02K 1/00*    (2006.01)
*H02K 1/18*    (2006.01)
*H02K 1/14*    (2006.01)

(52) U.S. Cl.
CPC ..................... *H02K 1/148* (2013.01)

(58) Field of Classification Search
USPC .......................................... 310/259, 216, 218
IPC .................................................. H02K 1/18,1/00
See application file for complete search history.

(56) References Cited

U.S. PATENT DOCUMENTS 5,402,028 A * 3/1995 Koeber et al. ........... 310/216.114
5,786,651 A * 7/1998 Suzuki .................... 310/216.009
(Continued)

FOREIGN PATENT DOCUMENTS

DE    102 36 941 A1    3/2004
EP    0 833 427 A1    4/1998
(Continued)

OTHER PUBLICATIONS

JP2000-069694EN.pdf : English translation of JP 2000-069694A. (completed Dec. 9, 2008).*
(Continued)

*Primary Examiner* — John K Kim
(74) *Attorney, Agent, or Firm* — Panitch Schwarze Belisario & Nadel LLP

(57) ABSTRACT

The invention relates to a laminated core for electromagnetic applications with at least two segments (2), of which at least one on a side-edge (11), comprises an engagement groove (12) and the other at an opposite side-edge (9) comprises a corresponding engagement projection (10), via which the two segments (2) are connected to one another into a component, wherein the engagement groove (12) comprises an undercut in the form of a widened section (26) distanced to the groove opening, and the engagement projection (10) and the engagement groove (12) are dimensionally matched to one another in a manner such that the engagement projection (10) and/or engagement groove (12) are plastically deformed by way of inserting the engagement projection (10) into the engagement groove (12), so that the engagement projection (10) engages into the widened section (26) of the engagement groove (12), as well as to a method for the manufacture of such a laminated core.

21 Claims, 8 Drawing Sheets

(56) References Cited

U.S. PATENT DOCUMENTS

| | | | |
|---|---|---|---|
| 6,111,334 A * | 8/2000 | Horski et al. | 310/216.057 |
| 6,226,856 B1 * | 5/2001 | Kazama et al. | 29/596 |
| 6,486,583 B2 * | 11/2002 | van Heyden et al. | 310/218 |
| 6,504,284 B1 * | 1/2003 | Kazama et al. | 310/216.016 |
| 6,595,760 B2 * | 7/2003 | Shida et al. | 417/410.1 |
| 6,787,966 B2 * | 9/2004 | Haga | 310/269 |
| 6,794,786 B2 * | 9/2004 | Enomoto et al. | 310/218 |
| 6,812,611 B2 * | 11/2004 | Ando et al. | 310/216 |
| 6,882,080 B2 * | 4/2005 | Tanaka et al. | 310/216.112 |
| 7,414,347 B2 * | 8/2008 | Wang et al. | 310/260 |
| 2002/0135259 A1 * | 9/2002 | Eggers et al. | 310/216 |
| 2003/0098628 A1 * | 5/2003 | Enomoto et al. | 310/218 |
| 2004/0084988 A1 | 5/2004 | Sheeran et al. | |
| 2004/0189137 A1 * | 9/2004 | Hashimoto et al. | 310/218 |
| 2005/0067912 A1 * | 3/2005 | Murakami et al. | 310/216 |
| 2005/0116575 A1 * | 6/2005 | Zepp et al. | 310/218 |
| 2005/0189844 A1 * | 9/2005 | Du et al. | 310/259 |
| 2005/0212378 A1 * | 9/2005 | Wang et al. | 310/260 |
| 2007/0114875 A1 * | 5/2007 | Lyle et al. | 310/218 |
| 2007/0196615 A1 * | 8/2007 | Bach Andersen et al. | 428/57 |

FOREIGN PATENT DOCUMENTS

| | | | |
|---|---|---|---|
| EP | 0 969 581 A3 | | 2/2003 |
| JP | 6-502983 A | | 3/1994 |
| JP | 9-233742 A | | 9/1997 |
| JP | 10-155248 A | | 6/1998 |
| JP | 2000069694 A | * | 3/2000 |

OTHER PUBLICATIONS

JP2000-06964_EN.pdf : Kato (JP 2000-069694) English translation, 2000.*
JP 2000-69694EN.pdf : Kato (JP 2000-69694, English translation, 2000).*
Kato, JP 2000-069694 English translation, 2000.*
Wikipedia, Deformation, 2010, Wikipedia Encyclopedia.*
Japanese Office Action issued Nov. 16, 2010 in Japanese Application No. 2007-516999. (English translation attached).

* cited by examiner

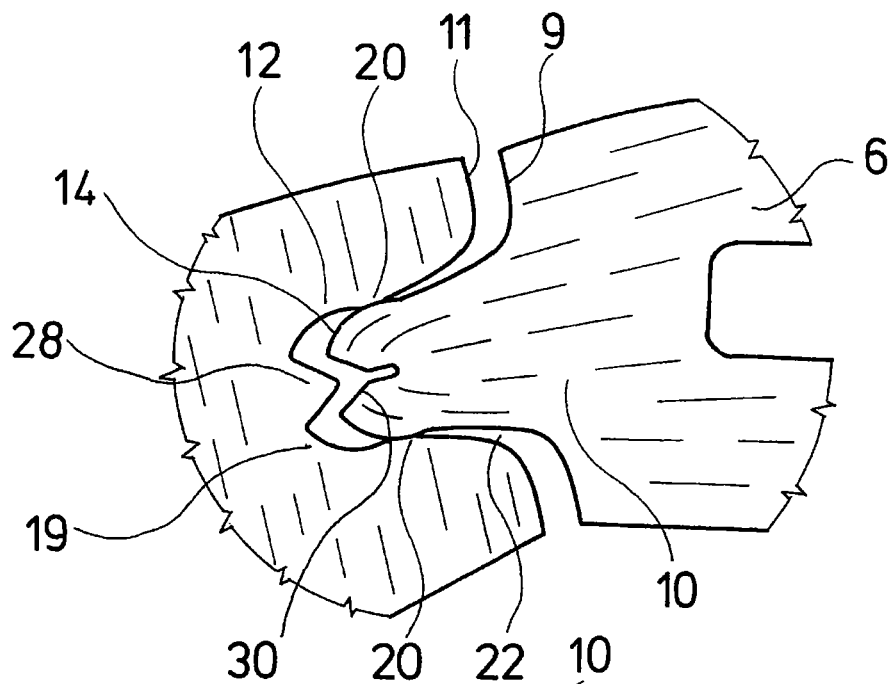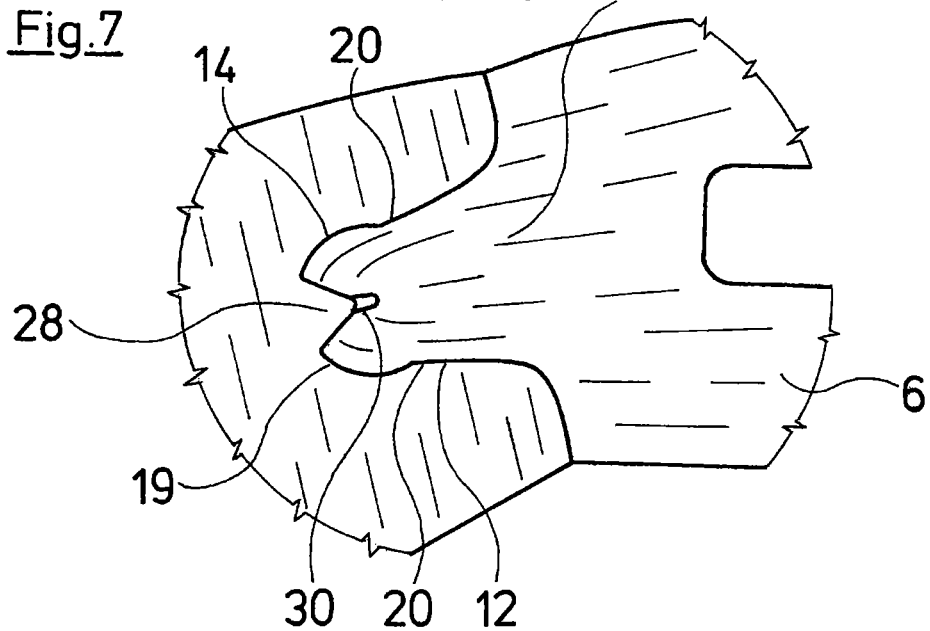

LAMINATED CORE FOR ELECTROMAGNETIC APPLICATIONS

CROSS-REFERENCE TO RELATED APPLICATIONS

This application is a Section 371 of International Application No. PCT/EP2005/003985, filed Apr. 15, 2005, which was published in the English language on Dec. 1, 2005, under International Publication No. WO 2005/114813 A1 and the disclosure of which is incorporated herein by reference.

BACKGROUND OF THE INVENTION

The invention relates to a laminated core for electromagnetic applications, as well as a method for manufacturing such a laminated core. Laminated cores for electromagnetic applications are for example applied as iron cores or ferromagnetic circuits in electromagnetic machines and installations. These may for example be laminated cores in transformers or stators of electric motors.

It is in particular with small electric motors which are manufactured in large batch numbers and for example are applied as drive motors of pump assemblies, in particular of circulation pumps for heating installations, that an inexpensive manufacture and assembly of all components is desired. This also includes an inexpensive manufacture of the stator.

In order to be able to attach windings for coils onto the laminated cores in electromagnetic devices and in particular electric motors, in a more simple manner, these laminated cores are manufactured from segments. Firstly, the coils are deposited onto the individual segments. Subsequently, the segments are firmly connected to one another in their final position. For this, it is known to connect individual stator segments to one another with the help of plug connections, as is known for example from U.S. Pat. No. 5,786,651 as well as U.S. Pat. No. 6,219,900 B1. For this, in each case a groove is formed at one side of the stator segment, and a corresponding projection at the opposite side, which engages into the groove of the adjacent segment. Thereby, a locking connection is formed between projections and groove, or a non-positive fit connection between the projection and groove is formed, which is held together on account of the elastic restoring forces of the groove walls. This arrangement has the disadvantage that the grooves and projections need to be manufactured with great precision in order to observe the tolerances required for the fit. It is particularly with large production numbers that the required tolerances are difficult to maintain on account of tool wear.

BRIEF SUMMARY OF THE INVENTION

It is therefore the object of the invention to provide a laminated core for electromagnetic applications, as well as a corresponding method for the manufacture of such a laminated core, which ensure a reliable connection between individual segments of the laminated core, and are manufacturable in an inexpensive manner.

The laminated core for electromagnetic applications comprises according to the invention at least two segments, of which at least one at a side-edge comprises an engagement groove and the other at an opposite side edge comprises a corresponding engagement projection. The two segments may be connected into a component via the engagement groove and the engagement projections. Furthermore, on each segment, one may form an engagement groove and an engagement projection on the opposite side, so that the individual segments in each case may be connected to two adjacent segments. Alternatively, one may also connect several segments to one another in a different manner, so that only individual segments are connected to one another in the described manner.

According to the invention, the engagement groove comprises an undercut in the form of an extended section distanced to the groove opening, which means the groove is formed in a narrowed manner distanced to the groove base, or widened in the vicinity of the groove base. The engagement projection and the engagement groove are furthermore dimensionally matched to one another in a manner such that the engagement projection and/or the engagement groove are plastically deformed by way of inserting the engagement projection into the engagement groove. Material of the engagement projection flows into the widened region of the groove by way of the plastic deformation, so that the narrowed region of the groove or the undercut is engaged behind, and thus a positive-fit connection of the two segments is achieved. Additionally, the engagement projection may comprise a necking distanced to the end-edge of the engagement projection, so that the engagement projection also comprises an undercut. Thus material of the engagement groove may also flow into the region of the necking of the engagement projection, and create a positive fit connection.

By way of the fact that the groove and the engagement projection are dimensioned such that a plastic deformation occurs on insertion, one may always ensure an adequately firm connection between the two segments of the laminated core. Thereby, less tight tolerances need to be observed than if a pure non-positive fit connection were to be created, caused by the elastic restoring forces of the engagement groove. By way of the dimensioning of the engagement projection and the undercut, which leads to a plastic deformation of the material, one succeeds in the material being firstly plastically deformed on joining together, so that a defined tolerance is achieved between the engagement projection and the engagement groove or undercut. Thus firstly a calibration of the oversize between the engagement projection and the engagement groove is effected by way of the plastic deformation.

In order to achieve the plastic deformation on meshing the engagement projection and engagement groove, a larger oversize between the engagement groove and the engagement projection is provided, i.e. the engagement groove at least in sections is preferably designed smaller than the engagement projection to be accommodated. By way of this, high surface pressings are produced between the engagement groove and the engagement projection on insertion of the engagement projection, at least in regions of the abutment surface. These in turn lead to such high stresses, in particular in the material of the engagement projection, that the stresses exceed the flow limit of the material and thus lead to a plastic deformation of the material.

The laminated core is preferably designed as a stator for an electric motor, preferably for a pump assembly, wherein the stator comprises at least two segments, i.e. stator segments, of which one at one side-edge comprises the engagement groove, and the other at an opposite side-edge comprises the corresponding engagement projection. In this manner, stators for electric motors can be manufactured, in particular for pump assemblies such as for example for heating circulation pumps, in large series production numbers and in a very inexpensive manner. The stator segments which in the known manner are composed of individual laminations are firstly provided with the required stator windings and then assembled into an annular stator via the engagement groove and the engagement projection. For this, each stator segment may comprise an engagement groove at an end-side directed in the peripheral direction, and an engagement projection at the opposite end-side. Alternatively, prior to this, individual stator segments may be movably connected into a chain by way of other connection types, wherein the stator segment at the first end of the chain, at its free end-edge comprises an engagement groove, and the second stator segment at the second end of the chain, at its free end-edge comprises a corresponding engagement projection. The chain may then be closed into an annular stator by way of meshing the engagement groove and the engagement projection. The connection of the individual stator segments into a chain may be effected for example by way of narrow lamination webs.

The stator designed according to the invention is particularly suitable for the application in a wet-running canned motor, as is applied for example with heating circulation pumps in the power range of 10 to 300 Watts. With canned motors, the rotor is mounted in the can. For this reason, the stator housing need only accommodate slight forces, and may be designed in a comparatively light manner. This is favored even further by the inventive, firm connection of the individual stator segments amongst one another, so that a segmented, but intrinsically stable stator is created which need not be held together by a surrounding stator housing.

Further preferred, the engagement projection comprises a section which engages into the widened section of the engagement groove, wherein the smallest width in the groove in the region between the groove opening and the undercut is matched to the greatest width of the section of the engagement projection, in a manner such that the engagement projection and/or the engagement groove are plastically deformed by way of inserting the engagement projection into the engagement groove. In particular, the section of the engagement projection has a corresponding larger width than the smallest groove width. The section of the engagement projection with the largest width passes on fitting the engagement projection and the engagement groove, the region of the smallest width of the engagement groove before the undercut. Thereby, a pressure force is produced between the engagement groove and the engagement projection on account of the difference in width. This in turn leads to stresses in the contact region between the engagement groove and engagement projection. The region of the smallest groove width and the region of the engagement projection with the largest width thereby are dimensioned such that the occurring stresses exceed the flow limit of the material, so that a plastic deformation of the material occurs. Thereby, the section of the groove with the lowest width may be selected so narrowly, and the region of the engagement projection with the greatest width may be selected so widely, that such high stresses are always produced on assembly, that the flow limit is definitely exceeded. In order to ensure this, certain minimum differences in the dimension of the smallest groove width and the largest width of the engagement projection need to be observed. It is however not necessary to observe exact tolerances as are required for a purely non-positive fit fittings or purely elastic connections. In this manner, the influences of tool wear on punching the laminated cores may be minimized.

Furthermore, the smallest width of the groove in the region between the groove opening and the undercut can be matched to the largest width of a widened section of the engagement projection, such that an elastic deformation of the engagement groove occurs additionally to the plastic deformation on inserting the engagement projection into the engagement groove. This elastic deformation has the effect that the groove is firstly widened on insertion of the engagement projection, and then elastically contracts again when the widened section of the engagement projection has passed the section of the smallest width of the groove, i.e. has passed the undercut, so that the engagement projection with its widened section engages behind the undercut of the groove. Additionally, according to the invention, the plastic deformation of the engagement groove and/or engagement projection which has already been described occurs. The plastic deformation has the effect that the engagement groove and/or the engagement projection on joining together, are firstly plastically deformed to the oversize required for the elastic deformation. I.e. the oversize or the width difference between the engagement projection and the engagement groove, according to the invention, is selected larger than is required for locking-in or snapping-in amid elastic deformation. The oversize is reduced to the amount required for the elastic engagement by way of the plastic deformation. In this manner, a secure locking connection between the engagement groove and the engagement projection, despite large tolerance ranges can be ensured. On meshing, the parts automatically calibrate themselves to the desired measure by way of the plastic deformation. Thus the relative oversize between the widest part of the engagement projection and the narrowest location of the engagement groove can have a very large tolerance, for example in the range of $1/100$ mm to $10/100$ mm.

Particularly preferably, the engagement groove extends with a preferably constant cross section over the whole axial length of the segment of the laminated core. In this manner, a secure connection of the segment to an adjacent segment may be achieved over the whole length of the segments. In the case that the segments are stator segments, the engagement groove extends preferably parallel to the longitudinal axis of the stator along a side-edge or end-edge of the stator segment.

Preferably moreover, the engagement projection with a preferably constant cross section extends over the whole axial length of the segment. Thus it can be ensured that the segment is in engagement with an adjacent segment over the complete length, and thus creates a firm connection. If the segment forms a stator segment of a stator, the engagement projection preferably extends on an end-side or end-edge of the stator segment parallel to the stator longitudinal axis.

The engagement projection particularly preferably has a round, preferably circular cross section, from which a web extends to the side edge of the segment. By way of the round cross section of the projection, one succeeds in the engagement projection contacting the walls of the engagement groove only with two small, diametrically opposite peripheral sections. Thus preferably essentially only a line contact occurs, by which means the stresses occurring in this region increase so much on insertion of the engagement projection into the engagement groove, that the flow limit of the material is exceeded and the material of the engagement projection is pressed or can flow behind the undercut of the engagement groove. In place of the circular cross section, one may also apply an oval or differently shaped cross section with small contact surfaces. A sufficiently large force for overcoming the flow limit in a wide tolerance range of the relative oversize between the engagement groove and engagement projection e.g. in the range of $1/100$ mm to $10/100$ mm may be ensured by the narrow region, preferably in the form of a line contact between the engagement groove and the engagement projection. Simultaneously, sufficiently large surface pressing for overcoming the flow limit will be produced in the small or narrow contact region, even with low joining forces. The low joining forces have the advantage that a damage of the segments to be joined, and in particular a separating of the individual laminations, is avoided.

Preferably, the web proceeding from the round cross section widens to the side edge of the segment. In this manner, the web in the border region to the segment is reinforced, so that an undesired deformation of the web in this region may be avoided.

Accordingly, the engagement groove preferably proceeding from its region with the smallest width, widens towards the groove opening. In this manner, the insertion of the engagement projection is simplified and it is ensured that an undesired plastic deformation in this region of the engagement groove may not occur on insertion of the engagement projection.

Usefully, the engagement groove has cross-sectional area which is sufficiently larger than the engagement projection, that free spaces are formed for accommodating the plastically deformed material. In this manner, it is ensured that the engagement projection and the engagement groove are able to be joined together safely amid plastic deformation to such an extent that the deformed material enters into the widened region, which means enters behind the undercut of the engagement groove. By way of a suitably large design of the free spaces it is possible to ensure that the two segments of the laminated core which are to be connected always abut on one another at defined bearing surfaces, and are positioned to one another.

Thereby, it is particularly preferred for the individual segments to abut on one another in each case with their-edges. A defined positioning of the segments relative to one another is ensured by way of this. In particular, with a stator it is thus ensured that the stator segments in the region of their side-edges bear on one another in a defined manner, and in the peripheral direction do not come to abut in the deformation region of the engagement projection and engagement groove in an undefined manner. This too is preferably achieved by way of sufficiently large free spaces for accommodating the plastically deformed material.

According to a special embodiment, a deformation element may be arranged in the engagement groove in the region of the groove base, which deforms the engaging engagement projection in a manner such that it engages into the widened section of the engagement groove, and engages around or behind the undercut. This arrangement has the effect of the plastic deformation of the engagement projection being initiated or reinforced by the deformation element after passing the undercut, i.e. the region of the groove with the lowest width. By the deformation element, the engagement projection at its end, which is at the front in the insertion direction, is deformed or widened such that it engages behind the undercut in the engagement groove. The additional widening of the engagement projection by the deformation element permits the formation of a larger undercut, so that a more firm connection between the segments bordering one another may be achieved. Additionally, the engagement projection and the engagement groove may also be dimensioned such that a plastic deformation of the engagement projection and/or engagement groove occurs already with the engagement projection passing the section with the smallest groove width. The deformation element for example may be designed as a wedge which extends from the groove base in the insertion direction to the groove opening, and tapers in this direction.

The segments consist preferably of a multitude of laminations, wherein at least one lamination with an engagement projection which is in engagement with an engagement groove of an adjacent segment amid plastic deformation, and at least one lamination with an engagement groove which is in engagement with an engagement projection of an adjacent segment amid plastic deformation, are formed in each segment. This means that in the segment or laminated core, not each lamination needs to be designed such that it comprises an engagement projection and/or engagement groove which are in engagement with a corresponding engagement groove or a corresponding engagement projection respectively, of an adjacent segment in the previously described manner amid plastic deformation. It is sufficient for individual laminations of the segments or laminated cores to be dimensioned such that always at least one lamination of the segment, according to the invention, is in engagement with a lamination of an adjacent segment via engagement groove and engagement projection amid plastic deformation.

The invention further relates to a method for the manufacture of a laminated core according to the preceding description. The laminated core is assembled into a component from of at least two segments. At least one of the two segments, at a side-edge comprises an engagement groove, and the other at a side-edge lying opposite the side-edge of the first segment comprises a corresponding engagement projection. In order to assemble the laminated core, the segments are joined to one another such that the engagement projection of the first segment engages into the engagement groove of the other adjacent segment. In this manner a positive fit connection between the two segments is created.

According to the invention, the engagement groove is designed with an undercut in the form of a widened section distanced to the groove opening. This means the groove is formed necked or narrowed distanced to the groove base or groove floor. Furthermore, the engagement projection and the engagement groove are matched to one another in their dimensions such that a plastic deformation of the engagement projection and/or of the engagement groove occurs on insertion of the engagement projection into the engagement groove. By way of this plastic deformation, one succeeds in the engagement projection, in the assembled condition of both segments, engaging into the widened section of the engagement groove and thus engaging behind the undercut and creating a positive-fit connection. The plastic deformation of the engagement projection and/or of the material surrounding the engagement groove is achieved by way of dimensioning the engagement groove and the engagement projection such that such high pressure between the engagement groove and the engagement projection occurs on assembling the engagement groove and engagement projection, that the stresses in the inside of the material exceed the flow limit, that material is plastically deformed and is pressed into the widened section of the engagement groove, in order to engage around the undercut. Additionally, the material, at the edge of the engagement groove, may be pressed into a necking or recess on the engagement projection, so that here too a positive-fit engagement between the engagement projection and the engagement groove is achieved by plastic deformation.

The method is preferably designed such that the engagement projection comprises a section which engages into the widened section of the engagement groove, wherein the lowest width of the groove in the region between the groove opening and the undercut is matched to the greatest width of the section of the engagement projection such that the engagement projection and/or the engagement groove plastically deform on insertion of the engagement projection into the engagement groove. The section of the engagement projection is dimensioned such that it has a greater width than the smallest width of the engagement groove. Thus the required high pressure forces or surface pressing occur between this section when it passes the region of the groove with the lowest width.

An elastic deformation of the engagement groove particularly preferably occurs additionally to the plastic deformation, on inserting the engagement projection into the engagement groove. This means that the engagement groove is widened on insertion of the engagement projection, wherein a clamping force acting on the engagement projection is produced by elastic restoring forces. Particularly preferably, the engagement groove is then widened when the widest section of the engagement projection passes the narrowest location of the engagement groove in front of the undercut. If the widened section of the engagement groove then enters into the widened section of the engagement groove behind the undercut, the walls of the engagement groove again return to their initial position on account of elastic restoring forces, so that the section with the lowest width of the groove engages around the widened section of the engagement projection. A locking connection between the engagement projection and the engagement groove is created in this manner.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 6 is a detailed view of the engagement projection and the engagement groove according to a second embodiment of the invention, in the condition of not being fully connected, FIG. 7 is a view of the engagement projection and the engagement groove according to FIG. 6 in the completely connected condition.

DETAILED DESCRIPTION OF THE INVENTION

Figure 1:
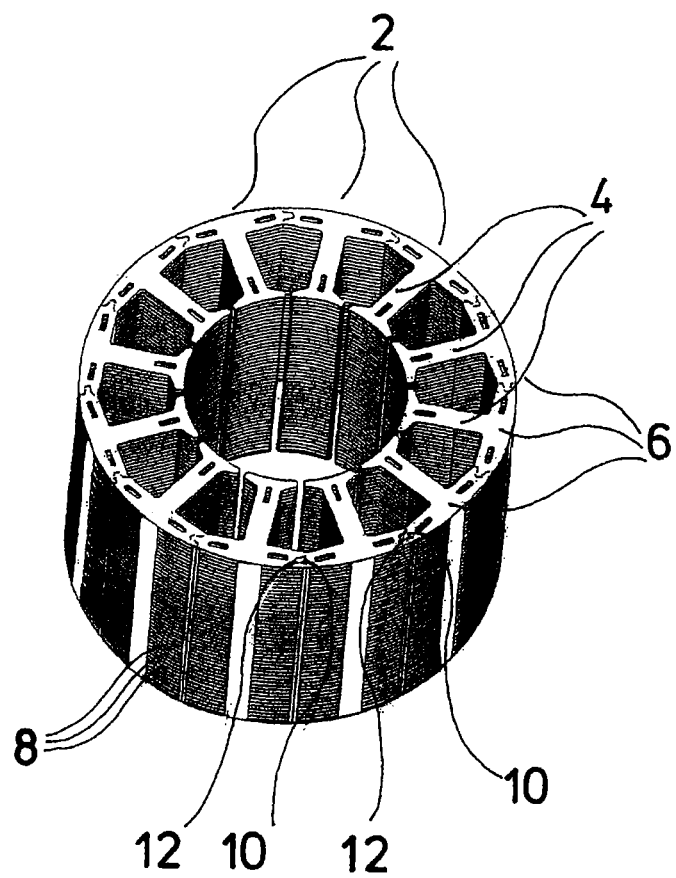
FIG. 1 is a perspective view of a stator for an electric motor, according to the present invention.

FIG. 1 in a perspective view shows a laminated core according to the present invention in the form of a stator for an electric motor. Such a stator for example is applied in an electric motor for the drive of a heating circulation pump. The stator consists of twelve stator segments 2. The stator segments 2 in the known manner are designed in a T-shaped manner with radially inwardly directed pole limbs 4. Stator windings (not shown here) are arranged or wound around the pole limbs 4. Pole ring sections 6 extend transversely to the pole limbs 4 on the radial outer side of the stator segments 2 in the peripheral direction. The complete stator segments are designed as a laminated core of a multitude of identical laminations 8 stacked on one another.

As shown, the twelve individual stator segments 2 are joined together into a stator ring, wherein the individual stator segments 2 in the region of their pole ring sections 6 are connected to one another such that a closed pole ring is formed on the outer periphery of the stator. For this, engagement projections 10 and engagement grooves 12 are formed on each stator segment on sides or end-edges 9, 11 of the pole ring sections 6, which are opposite to one another in the peripheral direction, wherein an engagement projection 10 is formed on each stator segment 2 at a side-edge 9, and an engagement groove 12 at the opposite side edge 11.

Figure 2:
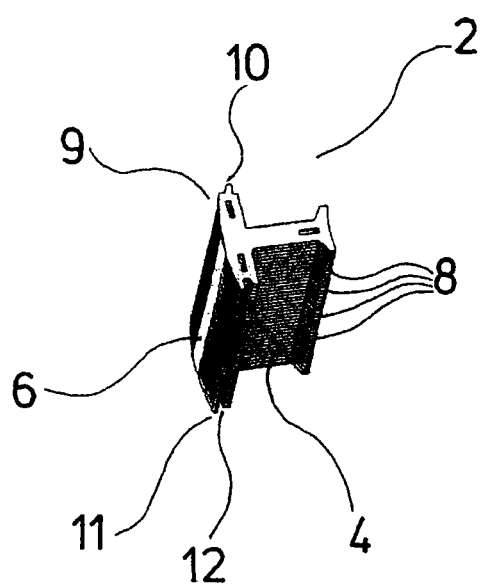
FIG. 2 is a perspective view of a stator segment of the stator shown in FIG. 1.

This may be seen more clearly in FIG. 2, which shows a single stator segment of the stator shown in FIG. 1, in detail. The engagement projection 10 and the engagement groove 12 in each case extend over the whole length of the associated side edge of the pole ring section 6. Thereby, the engagement projection 10 and the engagement groove 12 have a constant cross section over the entire length. The engagement projection 10 is formed by projections and the engagement groove 12 correspondingly by recesses, on the individual laminations 8. Furthermore, the engagement groove 12 and the engagement projection 10 extend in the peripheral direction of the stator, so that the stator segments may be joined together in this direction.

Figure 3:
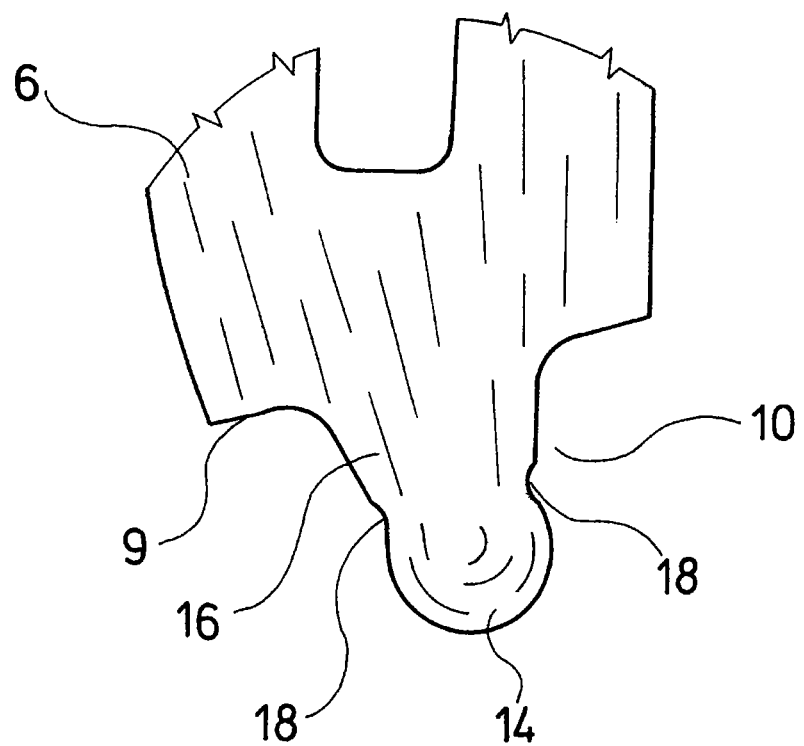
FIG. 3 is a detailed view of an engagement projection in a plan view.
Figure 4:
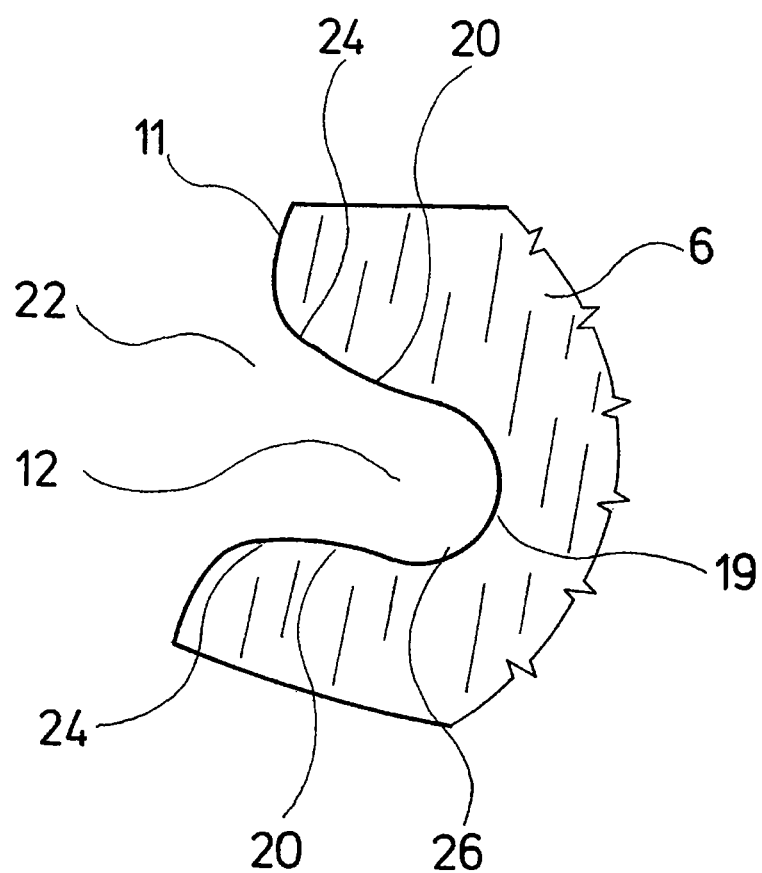
FIG. 4 is a detailed view of an engagement groove in a plan view.
Figure 5:
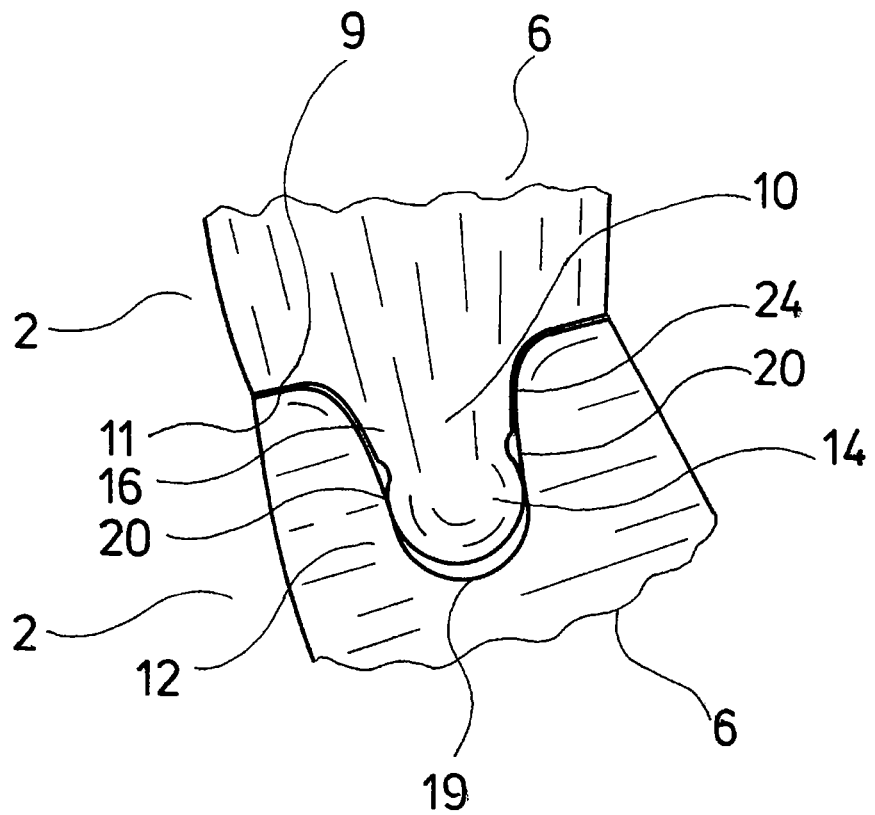
FIG. 5 is a view of the engagement projection according to FIG. 3 and of the engagement groove according to FIG. 4 in the connected condition.

The engagement between the engagement projection 10 and the engagement groove 12 is explained in more detail by way of FIG. 3 to 5.

FIG. 3 shows a schematic plan view of the engagement projection 10. The engagement projection 10 extends proceeding from a side edge 9 of the pole section 6 of a stator segment 2. Thereby the front, free end of the engagement projection 10 in cross section is formed essentially as a circular section 14. The circular section 14 is connected to the side edge 9 via a web 16, which proceeding from the circular cross section 14 widens towards the side-edge 9. The connection of the web 16 to the circular section 14 is effected in the region of a circular chord distanced to the diameter of the circular section 14, so that neckings or indentations 18 are formed between the web 16 and the circular section 14.

FIG. 4 shows a corresponding detailed view of the engagement groove 12 on the opposite side-edge 11 of the pole ring section 6. The engagement groove 12 in the region of the groove base 19 has a circular contour which is essentially matched to the circular contour of the circular section 14 on the engagement projection 10. The engagement groove 12, distanced to the groove base 19, comprises oppositely lying projections 20 on its side walls, said projections forming a narrowing or undercut. Proceeding from the projections 20, the engagement groove 12 widens towards to the groove opening 22. The widening sections 24 of the groove wall facing the groove opening 22, in cross section, define a shape which corresponds to the cross-sectional shape of the web 16.

FIG. 5 in cross section shows the assembled condition of the engagement projection 10 according to FIG. 3 and the engagement groove 12 according to FIG. 4. On inserting the engagement projection 10 into the engagement groove 12, firstly the circular section 14 with its largest width situated in the diameter direction must pass the narrowing or undercut in the engagement groove 12, which are formed by the projections 20. Thereby, the diameter of the circular section 14 is larger than the distance between the projections 20 to the extent that such high pressure loading occurs between the projections 20 and the diametrically opposite outer sides of the circular section 14, that the material in the region of the circular section 14 of the engagement projection 10 is plastically deformed, and flows into the region 26 (see FIG. 4) of the engagement groove 12, which is situated behind the projections 20 in the insertion direction, i.e. facing the groove base 19. The engagement projection 10 and in particular its circular section 14 engage behind the projections 20 in this manner. Additionally, an elastic deformation occurs, with which the engagement groove 12 widens on insertion, and when the circular section 14 of the engagement projection 10 has passed the projections 20 in the engagement grove 12, again narrows on account of the elastic restoring forces, so that the projections 20 come into engagement with the engagement projection 10 in the region of the indentations 18. On this way a firm, positive-fit connection in the manner of a locking connection is formed between the engagement projection 10 and the engagement groove 12.

The engagement groove 12 and the engagement projection 10 are dimensioned such that in the assembled condition, free spaces remain in the region of the indentations 18 as well as between the circular section 14 and the groove base 19. Sufficient space for receiving the plastically deformed material is present in this manner. By way of this, it is ensured that the stator segments 12 which are adjacent to one another always come to abut with their side-edges 9 and 11 in a defined manner. Furthermore, the sections 24 of the groove wall come to abut with the side walls of the web 16 of the engagement projection 10. In this region, it is always possible to create a defined abutment, which permits a geometrically predefined positioning of the individual stator segments 2 to one another. By way of the free spaces in the region of the indentations 18 as well as of the groove base 19, it is ensured that the positioning in the peripheral direction is not effected in the deformation region between the engagement projection 10 and the engagement groove 12.

FIGS. 6 and 7 show the engagement projection 10 and the engagement groove 12 according to a second embodiment of the invention. FIG. 6 shows a view in the not yet completely assembled condition, and FIG. 7 shows the completely assembled condition of the engagement projection 10 and the engagement groove 12. The engagement projection 10 and the engagement groove 12 according to FIGS. 6 and 7 comprise all features explained by way of the FIGS. 3 to 5, so that a repetition of these features is not made. Additionally, according to FIGS. 6 and 7, a wedge 28 is formed on the groove base 19, which extends proceeding from the groove base 19 to the groove opening 22 and tapers in this direction in a wedge-like manner. Lying opposite the wedge 28, an inwardly directed wedge-like recess 30 is formed at the end-side of the engagement projection 10, i.e. in the region of the circular section 14. Furthermore, this is lengthened in a groove-like manner in the longitudinal direction of the engagement projection 10 at the tip of the wedge-like recess (30).

The arrangement of the wedge 28 and the recess 30 have the effect that the wedge 28 engages into the recess 30 as shown in FIG. 7, when the engagement projection 10 is inserted into the engagement groove 12. The wedge 28 is dimensioned such that it has a larger width or larger cross section than the recess 30. The effect of this is that the wedge 28 widens the engagement projection 10 by way of engagement into the recess 30, so that the parts of the circular section 14 which are separated by the recess 30 are pressed apart in the radial direction transversely to the insert direction of the engagement projection 10, and preferably plastically deformed. The effect of this is that the circular section 14 of the engagement projection 10 may engage behind the projections 20 in the engagement groove 12 to an even greater extent. The clamping force of the circular section 14 in the engagement groove 12 behind the projections 20 is increased further such that a firm, mechanical connection of the engagement projection and engagement groove is achieved.

Figure 8:
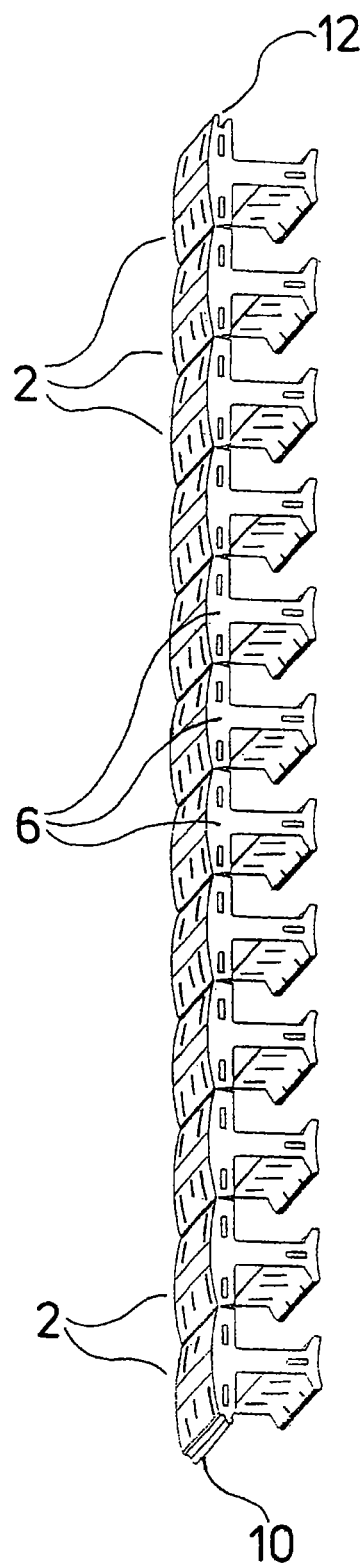
FIG. 8 is a perspective view of a chain of stator segments connected to one another, according to a particular embodiment of the invention

FIG. 8 shows a chain of stator segments 2 for forming an annular stator similar to that stator shown in FIG. 1. In contrast to the stator shown in FIG. 1, the twelve stator segments 2 according to the embodiment in FIG. 8 are already articulately connected to one another into a chain in a premanufactured manner. This for example may be effected by narrow plidable webs between the laminations 8 of the individual stator segments 2. Advantageously, the laminations 8 of all twelve stator segments 2 are punched as one piece for this. Only the two stator segments 2 situated at the end of the chain have an engagement projection 10 or engagement groove 12 according to the previously mentioned design, wherein the engagement groove 12 is formed at one end of the chain and the engagement projection 10 at the opposite end of the chain. For assembling the stator, the stator segments 2 are bent around the articulated connections between the stator segments 2, such that the stator segments 2 with their side edges come to abut one another in the region of the pole ring sections 6. Furthermore, the engagement projection 10 at the one end of the chain engages into the engagement groove 12 at the other end of the chain in the previously described manner, so that a closed stator ring is formed.

Figure 9:
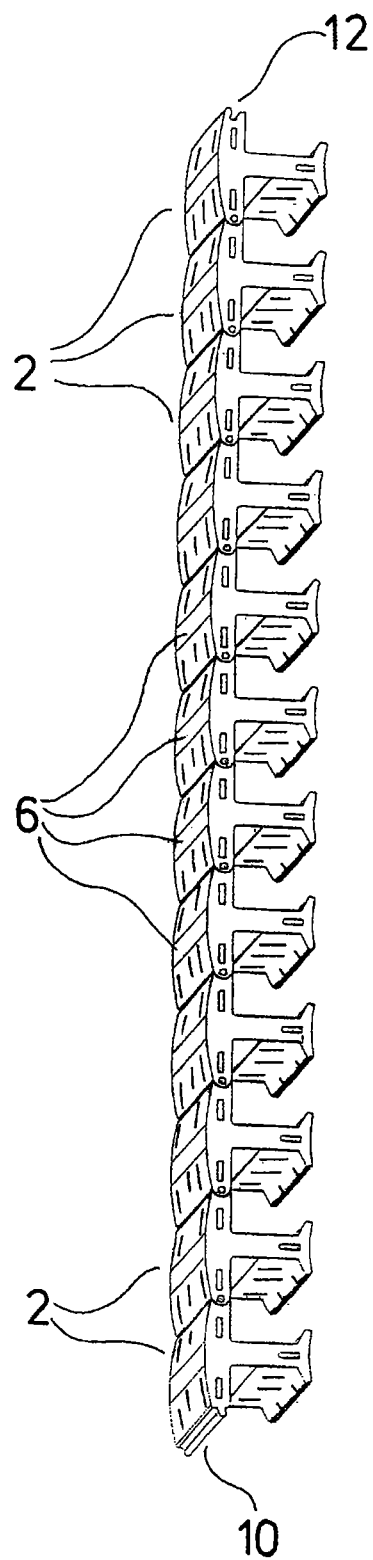
FIG. 9 is a perspective view of a chain of stator segments according to a further embodiment of the invention.

FIG. 9 shows a further embodiment of the chain of stator segments 2, which is shown in FIG. 8. In contrast to the embodiment according to FIG. 8, the individual stator segments 2 according to FIG. 9 are formed as separate components and are connected to one another by joint connections in the region of the pole ring sections 6. The joining-together into an annular stator is effected in the previously described manner by way of the engagement of the engagement projection 10 into the engagement groove 12 at the opposite end of the chain.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. A laminated core for electromagnetic applications with at least two segments (2), of which at least one at a first side-edge (11) comprises an engagement groove (12), and the other at an opposite second side-edge (9) comprises a corresponding engagement projection (10), via which the two segments are connected to one another into a component, wherein the engagement groove (12) comprises an undercut in the form of a widened section (26) distanced to the groove opening and the engagement projection (10) extends from the second side-edge (9) and comprises a free end and a web (16) that connects the free end to the second side-edge (9), and wherein the engagement projection (10) and the engagement groove (12) are dimensioned to one another in a manner such that at least one of the free end of the engagement projection (10) and the engagement groove (12) is elastically deformed by way of inserting the engagement projection (10) into the engagement groove (12) and at least one of the free end of the engagement projection (10) and the engagement groove (12) is plastically deformed by way of inserting the engagement projection (10) into the engagement groove (12), so that the engagement projection (10) engages into the widened section (26) of the engagement groove (12) to establish a secure locking connection.

2. A laminated core according to claim 1, wherein the laminated core is designed as a stator for an electric motor, wherein the stator comprises at least two stator segments (2), of which one at the first side-edge (11) comprises the engagement groove (12), and the other at the opposite second side-edge (9) comprises the corresponding engagement projection (10).

3. A laminated core according to claim 1, wherein the engagement projection (10) comprises a section (14) at the free end which engages into the widened section (26) of the engagement groove (12), wherein the smallest width of the groove in the region between a groove opening (22) and the undercut are matched to the largest width of the section (14) of the engagement projection (10) in a manner such that at least one of the section (14) at the free end of the engagement projection (10) and the engagement groove (12) is plastically deformed by way of insertion of the engagement projection (10) into the engagement groove (12).

4. A laminated core according to claim 1, wherein the smallest width of the groove in the region between the groove opening (22) and the undercut is matched to the greatest width of the widened section (14) of the engagement projection (10).

5. A laminated core according to claim 1, wherein the engagement groove (12) extends over the whole axial length of the segment (2) with a constant cross section.

6. A laminated core according to claim 1, wherein the engagement projection (10) extends over the whole axial length of the segment (2) with a constant cross section.

7. A laminated core according to claim 1, wherein the engagement projection (10) has a round cross section (14) at the free end from which the web (16) extends to the side-edge (9) of the segment (2).

8. A laminated core according to claim 7, wherein the web (16) proceeding from the round cross section (14), widens towards the side-edge (9) of the segment (2).

9. A laminated core according to claim 1, wherein the engagement groove (12) proceeding from its region with the smallest width, is widened towards the groove opening (22).

10. A laminated core according to claim 1, wherein the engagement groove (12) has a cross-sectional area which is sufficiently larger than the engagement projection (10), that free spaces are formed for accommodating the plastically deformed material.

11. A laminated core according to claim 1, wherein the individual segments (2) come to abut one another in each case with their side-edges (9, 11).

12. A laminated core according to claim 1, wherein a deformation element (28) is arranged in the engagement groove (12) in the region of a groove base (19), said deformation element deforming the engaging engagement projection (10) in a manner such that this projection engages into the widened section (26) of the engagement groove (12) and engages around the undercut.

13. A laminated core according to claim 1, wherein the segments (2) in each case are formed of a multitude of laminations (8), wherein at least one lamination (8) with an engagement projection (10) which is in engagement with an engagement groove (12) of an adjacent segment (2) amid plastic deformation, and at least one lamination (8) with an engagement groove (12) which is in engagement with an engagement projection (10) of an adjacent segment (2) amid plastic deformation, are formed in each segment (2).

14. A laminated core according to claim 1, wherein the plastic deformation of at least one of the engagement projection (10) and the engagement groove (12) is non-reversible.

15. A laminated core according to claim 1, wherein, upon insertion of the engagement projection (10) into the engagement groove (12), a pressure between material of the engagement groove (12) and the engagement projection (10) occurs causing stresses inside at least one the engagement groove (12) and engagement projection (10) at a contact zone to exceed a flow limit of the material.

16. A laminated core according to claim 2, wherein the electric motor is part of a pump assembly.

17. A laminated core according to claim 1, wherein the first side-edge (11) extends parallel to the second side-edge (9), the engagement groove (12) extends perpendicular to the first side-edge (11) and the engagement projection (10) extends perpendicular to the second side-edge (9).

18. A laminated core according to claim 1, wherein at least one of the free end of the engagement projection (10) and the engagement groove (12) is elastically deformed by way of inserting the engagement projection (10) into the engagement groove (12) and at least the other one of the free end of the engagement projection (10) and the engagement groove (12) is plastically deformed by way of inserting the engagement projection (10) into the engagement groove (12).

19. A method for manufacturing a laminated core, with which the laminated core is assembled into a component from at least two adjacent segments (2), of which at least a first segment at a side-edge (11) comprises an engagement groove (12), at least a second segment at an opposite side-edge (9) comprises a corresponding engagement projection (10), the method comprising:
   engaging the engagement projection (10) of the first segment (2) into the engagement groove (12) of the second segment (2), wherein the engagement groove (12) comprises an undercut in the form of a widened section (26) distanced to the groove opening, wherein the engagement projection (10) and the engagement groove (12) are dimensioned to one another;
   elastically deforming at least one of the engagement projection (10) and the engagement groove (12) on inserting the engagement projection (10) into the engagement groove (12); and
   plastically deforming at least one of the engagement projection (10) and the engagement groove (12) on inserting the engagement projection (10) into the engagement groove (12), so that the engagement projection (10) engages into the widened section (26) of the engagement groove (12).

20. A method according to claim 19, wherein the engagement projection (10) comprises a section (14) which engages into the widened section (26) of the engagement groove (12), wherein the smallest width of the engagement groove (12) in the region between the groove opening (22) and the undercut is matched to the greatest width of the section (14) of the engagement projection (10) in a manner such that at least one of the engagement projection (10) and the engagement groove (12) plastically deform on inserting the engagement projection (10) into the engagement groove (12).

21. A linear chain for electromagnetic applications having a plurality of stator segments (2) for forming an annular stator, one of the plurality of stator segments at one end of the chain having a side-edge (11) comprising an engagement groove (12), and another of the plurality of stator segments at an opposite end of the chain having an opposite side-edge (9) comprising a corresponding engagement projection (10), via which at least two of the stator segments are connected to one another into a component, wherein the engagement groove (12) comprises an undercut in the form of a widened section (26) distanced to the groove opening, the engagement projection (10) and the engagement groove (12) being dimensioned to one another in a manner such that at least one of the engagement projection (10) and the engagement groove (12) is elastically deformed by way of inserting the engagement projection (10) into the engagement groove (12) and at least one of the engagement projection (10) and the engagement groove (12) is plastically deformed by way of inserting the engagement projection (10) into the engagement groove (12), so that the engagement projection (10) engages into the widened section (26) of the engagement groove (12) to establish a secure locking connection.

\* \* \* \* \*